US012654506B2

(12) United States Patent
   Robinson

(10) Patent No.: US 12,654,506 B2
(45) Date of Patent: Jun. 16, 2026

(54) BUSHING LOAD TRANSDUCER

(71) Applicant: GM Global Technology Operations LLC, Detroit, MI (US)

(72) Inventor: Richard James Robinson, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 142 days.

(21) Appl. No.: 18/644,572

(22) Filed: Apr. 24, 2024

(65) Prior Publication Data

US 2025/0332880 A1     Oct. 30, 2025

(51) Int. Cl.
   *B60G 17/019* (2006.01)
   *G01L 1/12* (2006.01)
   *G01L 1/26* (2006.01)

(52) U.S. Cl.
   CPC .............. *B60G 17/019* (2013.01); *G01L 1/12* (2013.01); *G01L 1/26* (2013.01); *B60G 2401/11* (2013.01)

(58) Field of Classification Search
   CPC ... H02G 3/22; H02G 3/24; H02G 3/26; B60G 17/019; B60G 2401/11; G01L 1/12; G01L 1/26; H01B 17/301; H01B 17/005; H01B 17/30; H01B 17/00
   USPC ............. 174/142, 137 R, 139, 152 R, 138 R; 16/2.1, 2.2
   See application file for complete search history.

(56) References Cited

U.S. PATENT DOCUMENTS

| | | | | |
|---|---|---|---|---|
| 8,973,931 | B2 * | 3/2015 | Branger ................. | B60G 7/005 280/124.13 |
| 9,505,285 | B2 * | 11/2016 | Sugimoto ............. | F16F 1/3849 |
| 10,377,199 | B2 * | 8/2019 | Chung ................... | B60G 3/202 |
| 11,320,014 | B2 * | 5/2022 | Gendron ............... | F16F 1/3828 |
| 11,691,472 | B2 * | 7/2023 | Weber ..................... | B60G 7/02 280/124.1 |
| 2003/0172740 | A1 | 9/2003 | Stevenson et al. | |
| 2011/0088489 | A1 | 4/2011 | Yamamoto | |
| 2023/0392918 | A1 | 12/2023 | Mork et al. | |

FOREIGN PATENT DOCUMENTS

DE          10109121 A1     9/2002

* cited by examiner

*Primary Examiner* — Angel R Estrada
(74) *Attorney, Agent, or Firm* — Honigman LLP; Matthew H. Szalach; Jonathan P. O'Brien

(57) ABSTRACT

A bushing transducer comprising a transducer body, comprising a first end, a second end spaced axially from the first end with respect to a longitudinal axis, a first flange extending radially from the transducer body near the first end, a first seat extending radially from the transducer body and spaced axially from the flange, a first hole extending from the first end into the transducer body, a threaded portion spaced axially from the first seat toward the second end, a keyed portion, and a second hole extending from the second end into the transducer body. The bushing transducer further comprising a second seat removably coupled to the threaded portion, a second flange removably coupled to the keyed portion, and an anti-rotation key arranged between the first seat and the second seat and extending from the transducer body away from the longitudinal axis.

20 Claims, 5 Drawing Sheets

BUSHING LOAD TRANSDUCER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a bushing transducer and, more particularly, to a bushing transducer for measuring loads in two or more directions.

Vehicles and other machines may utilize one or more bushings during operation to reduce noise and vibration, for example. Determining an operational load of the one or more bushings may be desirable but it can be challenging to gather reliable results. Existing solutions for measuring the operational load of the one or more bushings requires drilling into each bushing which affects the stiffness of each bushing and, thus, affects the data obtained. Additionally, some existing solutions use set screws that make the bushings asymmetric and affect the results obtained. These shortcomings as well as others will be addressed by one or more aspects of the present disclosure.

SUMMARY

In one configuration, a bushing transducer is provided and includes a transducer body, including a first end, a second end spaced axially from the first end with respect to a longitudinal axis, a first flange extending radially from the transducer body near the first end, a first seat extending radially from the transducer body and spaced axially from the flange, a first hole extending from the first end into the transducer body, a threaded portion spaced axially from the first seat toward the second end, a keyed portion arranged between the threaded portion and the second end, and a second hole extending from the second end into the transducer body. The bushing transducer further includes a second seat removably coupled to the threaded portion, a second flange removably coupled to the keyed portion, and an anti-rotation key arranged between the first seat and the second seat and extending from the transducer body away from the longitudinal axis.

The bushing transducer may include one or more of the following aspects or steps. For example, a portion of the first and second holes may be tapped.

According to at least one example, the transducer body may further include a first mid portion arranged axially between the first flange and the first seat and a second mid portion arranged axially between the threaded portion and the second flange. The first mid portion may include a first inner portion and a first outer portion and the second mid portion may include a second inner portion and a second outer portion. One or more gages may be arranged about the longitudinal axis on the first inner portion and the second inner portion. The first and second inner portions may be cylindrical. The first and second inner portions may be octagonal.

According to another example, the first seat may include a first conical surface and the second seat may include a second conical surface, wherein the first conical surface faces the second conical surface.

According to at least one aspect, the transducer body may further include one or more channels parallel to the longitudinal axis and extending axially through the first seat and the threaded portion.

According to another aspect, the anti-rotation key may be an integral component of the transducer body.

In another configuration, a bushing is provided and includes a bushing body, including a first end, and a second end spaced axially from the first end with respect to a longitudinal axis. The bushing further includes a sleeve arranged within the bushing body between the first end and the second end, the sleeve including a necked portion including a first sleeve seat and a second sleeve seat spaced axially from the first sleeve seat with respect to the longitudinal axis. The bushing further includes a transducer including a transducer body including a first seat extending radially from the transducer body and a threaded portion spaced axially from the first seat and a second seat removably coupled to the threaded portion of the transducer body, axially trapping the transducer with respect to the sleeve.

The bushing may include one or more of the following aspects or steps. For example, the sleeve may further include a groove extending axially through a portion of the first sleeve seat and the second sleeve seat. The transducer may further include an anti-rotation key coupled to the transducer body and arranged in the groove to prevent rotation of the transducer with respect to the sleeve.

According to at least one example, the necked portion may be axially trapped between the first seat and the second seat.

According to another example, the first sleeve seat may engage a first conical surface of the first seat and the second sleeve seat may engage a second conical surface of the second seat.

In yet another configuration, a vehicle chassis is provided and includes a first chassis component including a first through hole and a second chassis component including a second through hole. The vehicle chassis further including a vehicle mount including a bushing body, including a first end and a second end spaced axially from the first end with respect to a longitudinal axis. The vehicle mount further including a sleeve arranged within the bushing body between the first end and the second end, the sleeve including a necked portion including a first sleeve seat and a second sleeve seat spaced axially from the first sleeve seat with respect to the longitudinal axis. The vehicle mount further including a transducer including a transducer body, including a first hole and a second hole extending along a longitudinal axis. The transducer body further including a transducer aligner arranged axially between the first hole and the second hole, including a first seat in contact with the first sleeve seat and a second seat removably coupled to the transducer body and engaged with the second sleeve seat. The vehicle chassis further including one or more fasteners coupling the vehicle mount to the first chassis component and the second chassis component.

The vehicle chassis may include one or more of the following aspects or steps. For example, the first seat and the second seat may include conical surfaces. The first sleeve seat and the second sleeve seat may include conical surfaces. The transducer may be axially and rotationally trapped within the sleeve and with respect to the longitudinal axis.

According to at least one example, the transducer includes one or more gages coupled to the transducer body.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
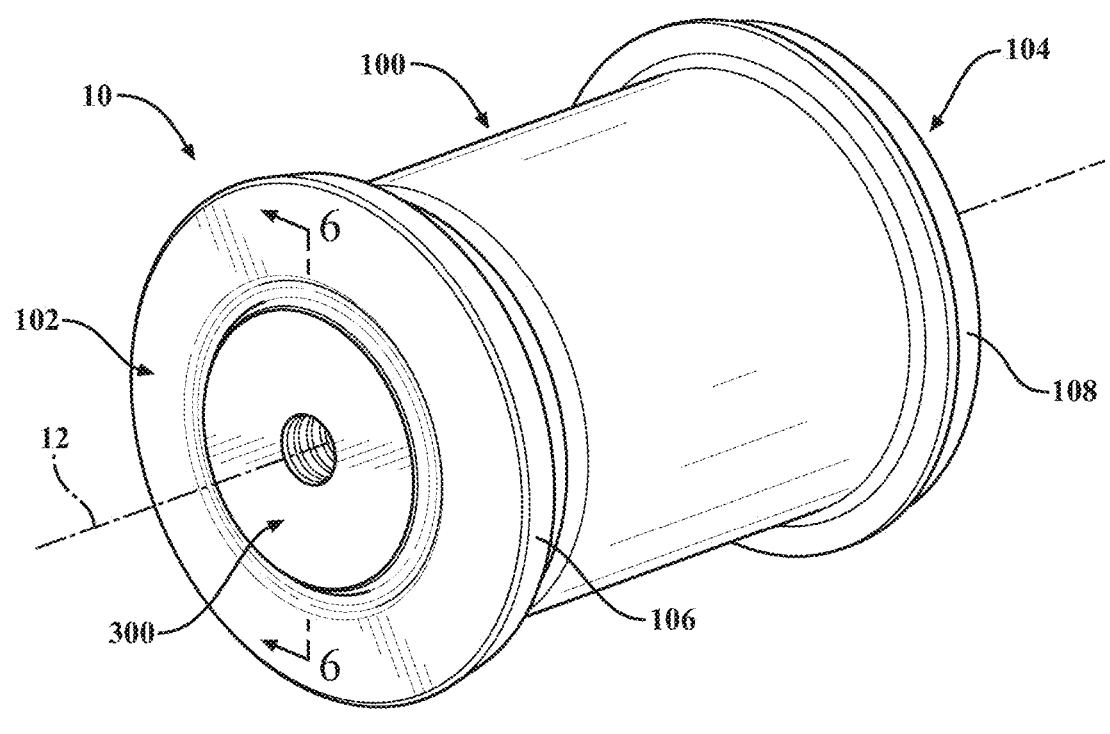
FIG. 1 is a perspective view of a bushing including a transducer according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
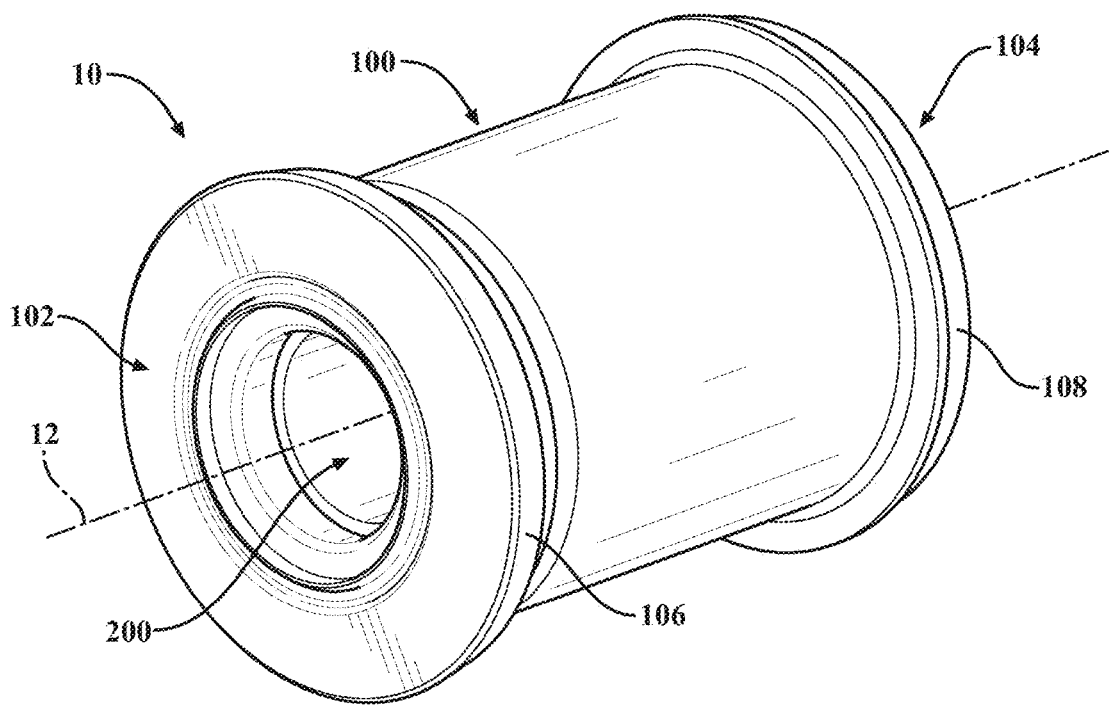
FIG. 2 is a perspective view of the bushing of FIG. 1 including a sleeve and having the transducer removed.

With reference to FIGS. 1 and 2, a bushing 10 is shown including a bushing body 100, a sleeve 200 (FIG. 2), and a transducer or bushing transducer 300 (FIG. 1). The bushing body 100 includes a first end 102 and a second end 104 spaced axially from the first end 102 with respect to a longitudinal axis 12. A first bushing flange 106 may be coupled to the bushing body 100 near the first end 102 and a second bushing flange 108 may be coupled to the bushing body 100 near the second end 104.

Figures 3, 4:
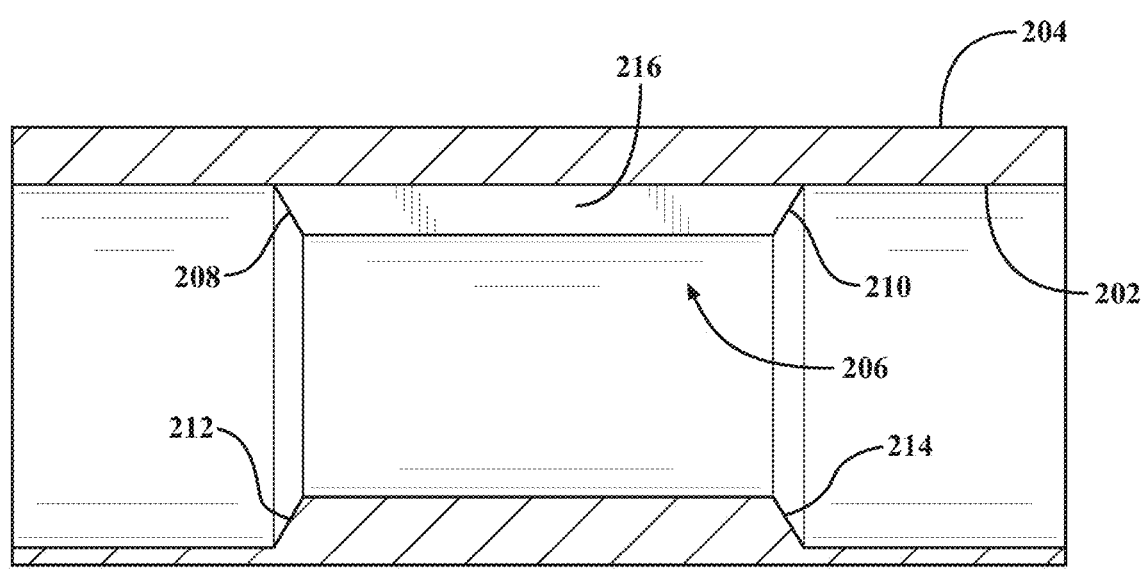
FIG. 3 is a cross-sectional view of the sleeve within the bushing of FIG. 2.
FIG. 4 is a perspective view of the transducer of FIG. 1 according to the principles of the present disclosure.

With reference to FIG. 2, the sleeve 200 is arranged within the bushing body 100 and extends between the first end 102 and the second end 104. As shown in FIG. 3, the sleeve 200 may include an inner diameter 202 and an outer diameter 204. A necked portion 206 may be arranged within the sleeve 200 and can include a first sleeve seat 208 and a second sleeve seat 210 spaced axially from the first sleeve seat 208. The first sleeve seat 208 can have a first conical sleeve surface 212 and the second sleeve seat 210 can have a second conical sleeve surface 214, as shown in FIG. 3. The sleeve 200 can include a groove 216 that extends axially through a portion of the necked portion 206.

Figure 5A:
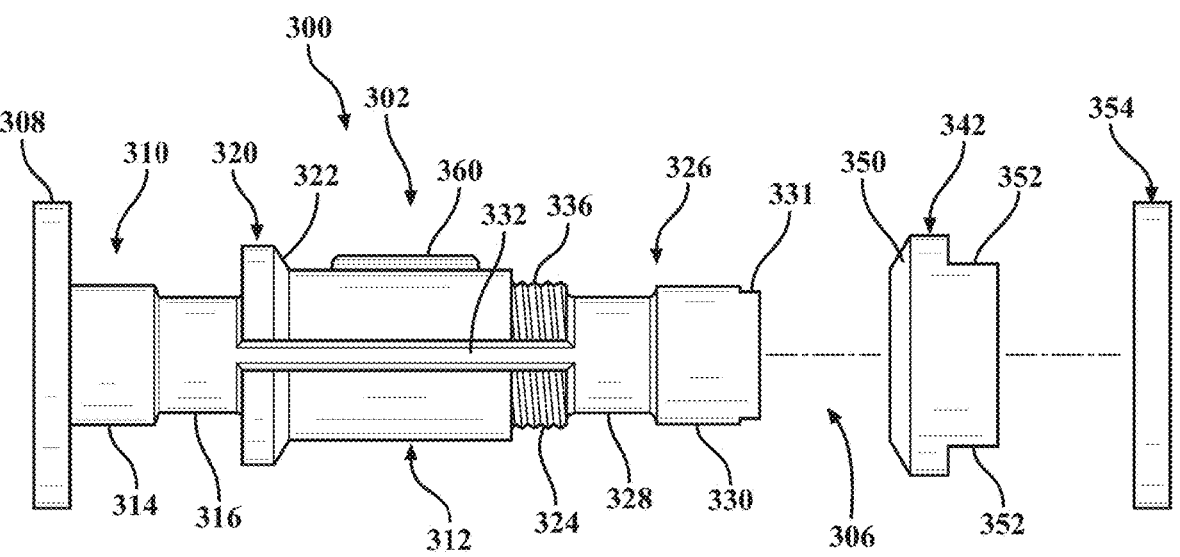
FIG. 5A is a front view of the transducer of FIG. 1 according to the principles of the present disclosure.
Figure 5B:
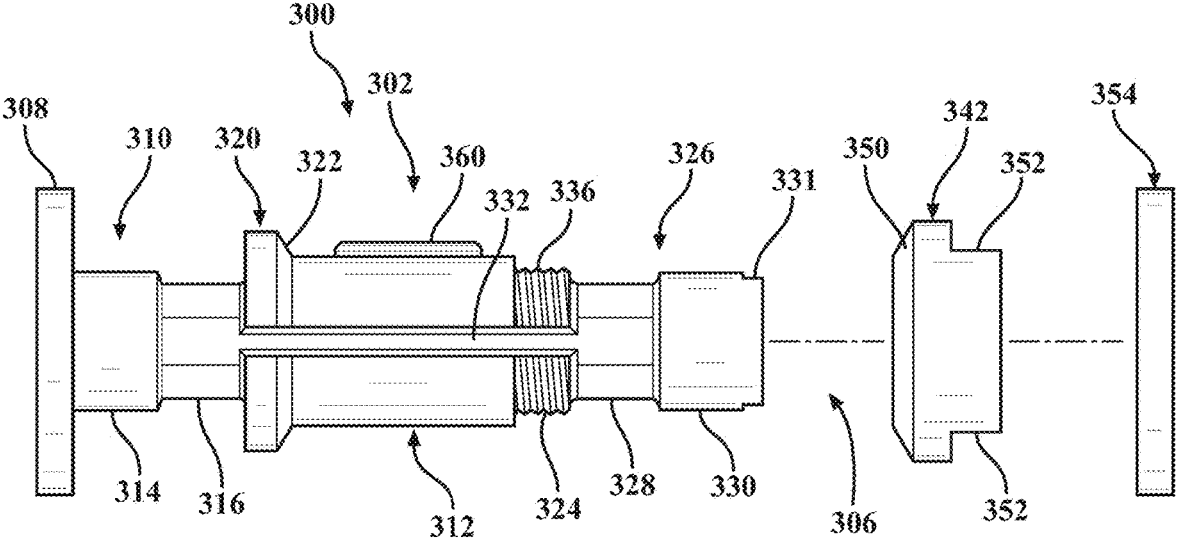
FIG. 5B is a front view of another configuration of the transducer of FIG. 1 according to the principles of the present disclosure.

With reference to FIG. 4, the transducer 300 includes a transducer body 302 including a first end 304 and a second end 306 spaced axially from the first end 304 with respect to the longitudinal axis 12. A first flange 308 may be arranged near the first end 304 and extends radially from the transducer body 302 and away from the longitudinal axis 12. The transducer body 302 can include a first mid portion 310 arranged axially between the first flange 308 and a transducer aligner 312. The first mid portion 310 may include a first outer portion 314 and a first inner portion 316. The first outer portion 314 and the first inner portion 316 can be the same shape (e.g., cylindrical), as shown in FIG. 5A. Alternatively, as shown in FIG. 5B, the first inner portion 316 can be a different shape (e.g., octagonal, square, rectangular, etc.) than the first outer portion 314. As will be discussed in more detail below, one or more gages 318 (e.g., stress or strain gages) may be arranged about the longitudinal axis 12 and coupled to the first inner portion 316, as shown in FIG. 8.

With reference to FIG. 5A, a first seat, such as a first aligner seat 320, is spaced axially from the first flange 308 and can extend radially from the transducer body 302. In other words, the first aligner seat 320 can extend from the transducer aligner 312 and away from the longitudinal axis 12. The first aligner seat 320 can include a first conical surface 322 that is configured to engage with the first sleeve seat 208 of the sleeve 200, as shown in FIG. 6.

With continued reference to FIG. 5A, the transducer body 302 and, more specifically, the transducer aligner 312 can include a threaded portion 324 spaced axially from the first aligner seat 320 towards the second end 306. A second mid portion 326 may be arranged axially between the transducer aligner 312 and the second end 306. The second mid portion 326 may include a second inner portion 328 and a second outer portion 330. The second inner portion 328 and the second outer portion 330 can be the same shape (e.g., cylindrical), as shown in FIG. 5A. Alternatively, as shown in FIG. 5B, the second inner portion 328 can be a different shape (e.g., octagonal, square, rectangular, etc.) than the second outer portion 330. As discussed in more detail below, the one or more gages 318 can be arranged about the longitudinal axis 12 and coupled to the second inner portion 328. A keyed portion 331 can extend from the second mid portion 326 and, more specifically, from the second outer portion 330.

Figure 8:
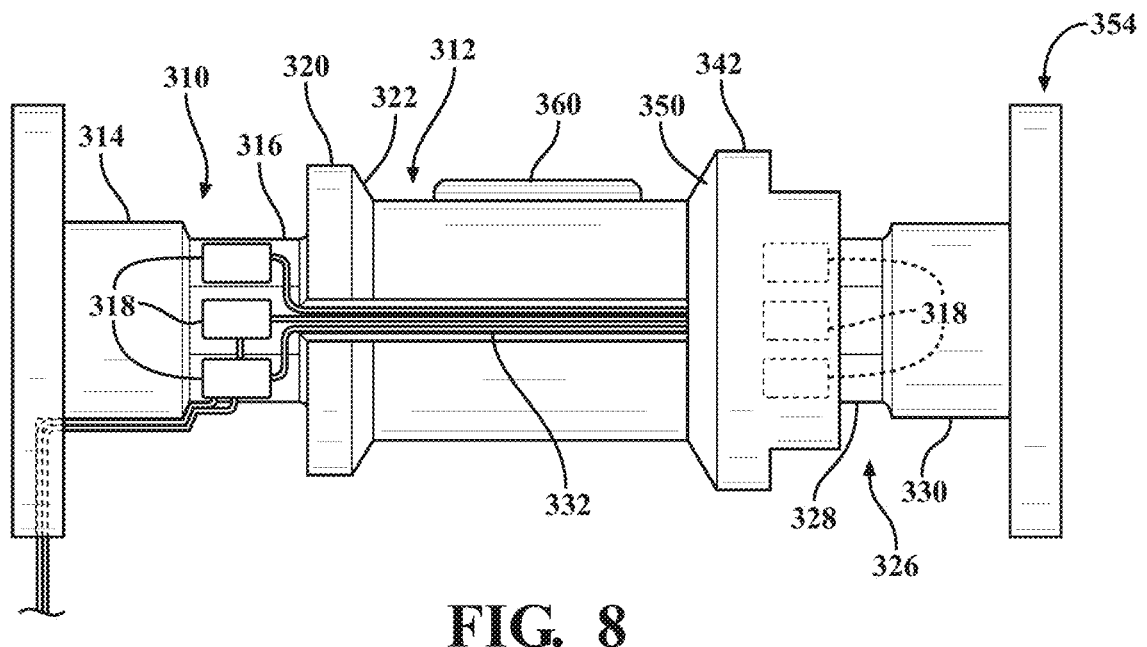
FIG. 8 is a front view of the transducer of FIG. 4 including one or more gages according to the principles of the present disclosure.

With reference to FIGS. 5A and 8, one or more channels 332 can extend axially through portions of the transducer body 302 to provide paths for wires of the one or more gages 318, for example. In other words, the one or more channels 332 may extend through the first aligner seat 320 and the threaded portion 324.

Figure 6:
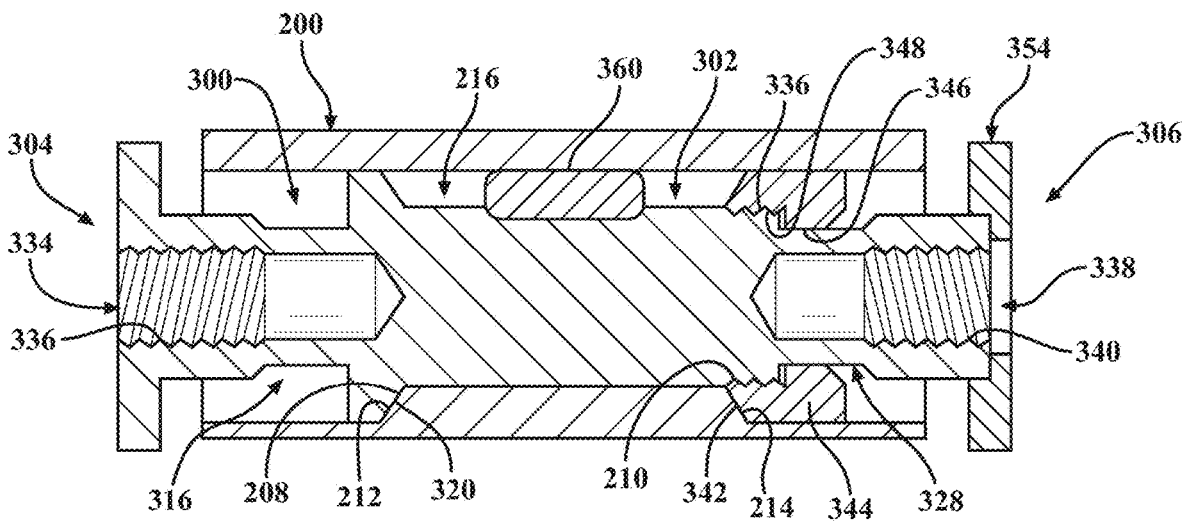
FIG. 6 is a cross-sectional view of the sleeve and transducer of FIG. 1 along line 6-6.

With reference to FIG. 6, a first hole 334 can extend axially from the first end 304 into a portion of the transducer body 302. A portion of the first hole 334 can be tapped to include threads 336. In the present example, the threads 336 extend between the first end 304 and into a portion of the first outer portion 314 so as to not interfere with the one or more gages 318 arranged on the first inner portion 316. In a similar fashion, a second hole 338 can extend axially from the second end 306 into a portion of the transducer body 302. A portion of the second hole 338 can be tapped to include threads 340. In the present example, the threads 340 extend between the second end 306 and into a portion of the second outer portion 330 so as to not interfere with the one or more gages 318 arranged on the second inner portion 328.

With reference again to FIG. 4, the transducer 300 can include a second seat, such as a second or removable aligner seat 342. The second aligner seat 342 can include a body 344 having a through hole 346. The through hole 346 includes threads 348 that correspond with the threaded portion 324 of the transducer body 302, as shown in FIG. 6. The body 344 can include a second conical surface 350 which extends radially around a portion of the body 344. The body 344 can also include one or more tool flats 352 (FIG. 4) for rotating the second aligner seat 342 about the longitudinal axis 12 to install the second aligner seat 342 on the transducer body 302.

Figure 7:
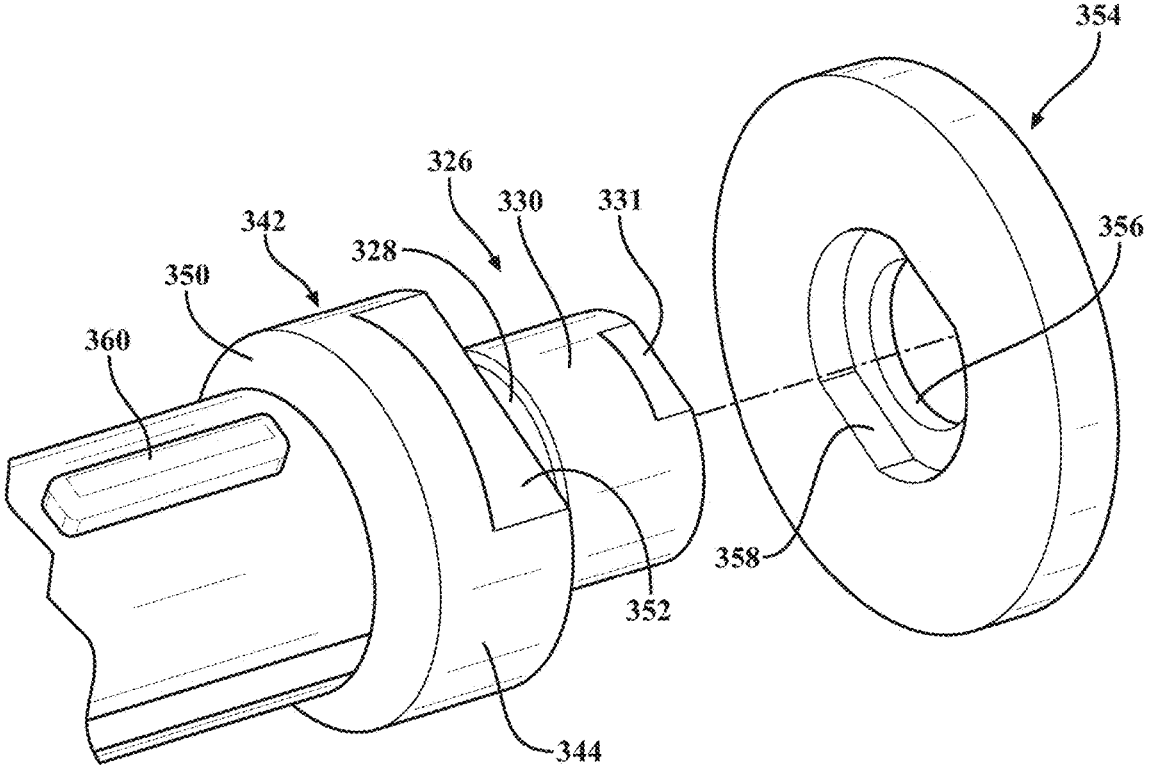
FIG. 7 is a fragmentary perspective view of the transducer of FIG. 4.

With continued reference to FIG. 4, the transducer 300 can include a second or removable second flange 354 having a through hole 356. The second flange 354 can include a keyway 358 which corresponds to the keyed portion 331 of the transducer body 302, as shown in FIG. 7. The keyway 358 may be desirable so that the second flange 354 does not rotate about the longitudinal axis 12 when arranged on the transducer body 302.

With reference again to FIG. 6, the transducer 300 can include an anti-rotation key 360 that is coupled to a portion of the transducer aligner 312 and arranged between the first aligner seat 320 and the second aligner seat 342, for example. The anti-rotation key 360 may be desirable to prevent rotation of the transducer 300 when the transducer 300 is arranged in the sleeve 200. In the present example, the anti-rotation key 360 is a separate component from the transducer body 302 but, in another configuration, can be an integral component of the transducer body 302.

In assembly, as shown in FIG. 6, the transducer body 302 may be inserted into the sleeve 200. In other words, the anti-rotation key 360 may be aligned with the groove 216 of the sleeve 200 so that the transducer body 302 can be axially advanced until the first aligner seat 320 engages with (i.e., contacts) the first conical sleeve surface 212 of the first sleeve seat 208. The second aligner seat 342 may be inserted into the sleeve 200 and into contact with threaded portion 324 of the transducer body 302. The second aligner seat 342 can be fastened to the transducer body 302 by engaging a tool with the tool flats 352 or otherwise. As shown in FIG. 7, the second aligner 342 may be fastened until the second conical surface 350 engages with (i.e., contacts) the second conical sleeve surface 214 of the second sleeve seat 210 and axially traps the transducer 300 with respect to the sleeve 200. A load (i.e., forces) may be evenly distributed around the circumference of the sleeve 200. Uniform load distribution on the sleeve 200 may be desirable so that axial loading of the bushing 10 may be reliably evaluated, for example. Upon fastening the second aligner seat 342 to the transducer body 302, the transducer 300 cannot rotate axially about or move along the longitudinal axis 12.

Figure 9:
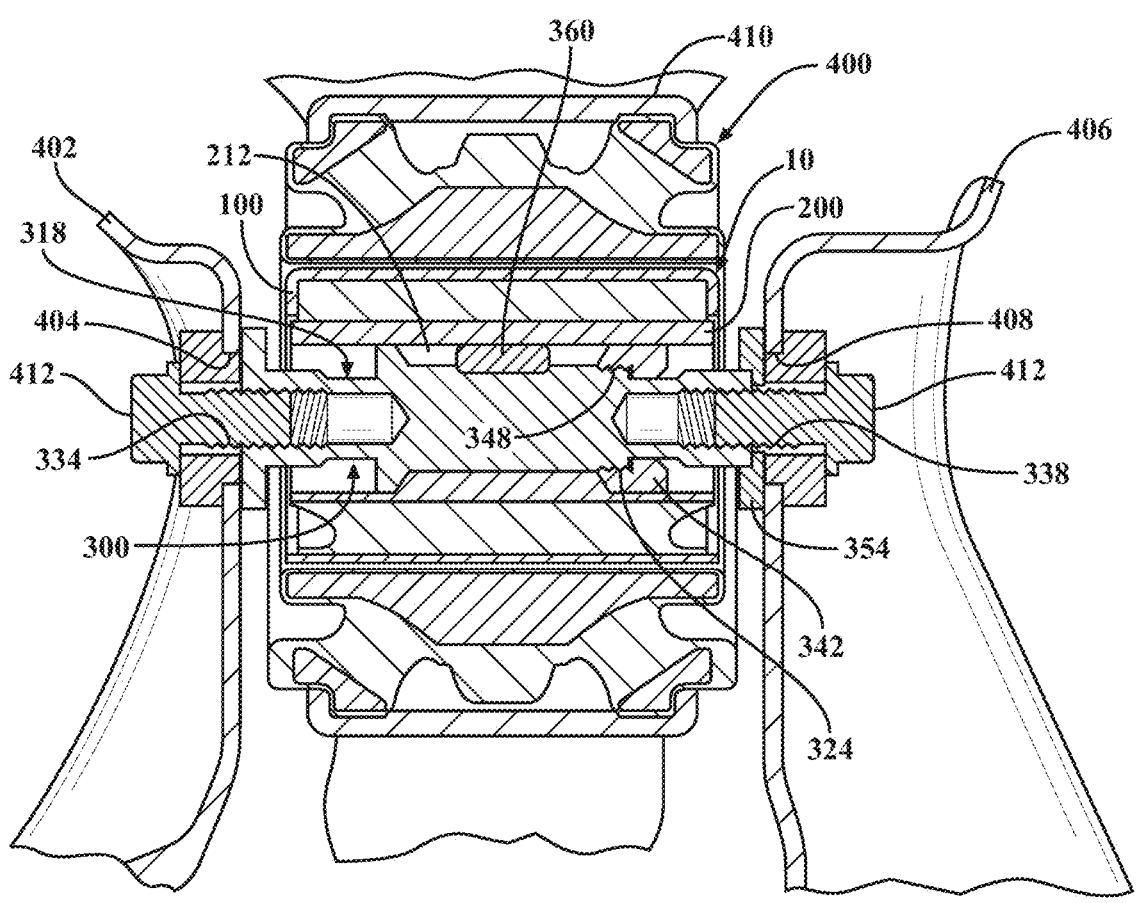
FIG. 9 is a cross-sectional view of a portion of a vehicle chassis according to the principles of the present disclosure.

With reference to FIG. 9, the bushing 10 may be arranged in a vehicle assembly. More particularly, the bushing 10 may be arranged in a vehicle chassis 400 of a vehicle (not shown). The vehicle chassis 400 can include a first vehicle or chassis component 402 having a first through hole 404 and a second vehicle or chassis component 406 having a second through hole 408. Additionally, the vehicle chassis 400 can include a vehicle mount, such as a powertrain mount 410 that can house the bushing 10. The powertrain mount 410 and, more particularly, the bushing 10 can be coupled to the first chassis component 402 and the second chassis component 406 using fasteners 412 that are inserted through the first and second through holes 404, 408 and fastened to the first and second holes 334, 338 of the transducer body 302. Arranging the bushing 10 with respect to the vehicle chassis 400 may be desirable to test various loading scenarios using the one or more gages 318.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:
1. A bushing transducer, comprising:
a transducer body, comprising
a first end, a second end spaced axially from the first end with respect to a longitudinal axis, a first flange extending radially from the transducer body near the first end, a first seat extending radially from the transducer body and spaced axially from the first flange, a first hole extending from the first end into the transducer body, a threaded portion spaced axially from the first seat toward the second end, a keyed portion arranged between the threaded portion and the second end, and a second hole extending from the second end into the transducer body;

a second seat removably coupled to the threaded portion;

a second flange removably coupled to the keyed portion; and an anti-rotation key arranged between the first seat and the second seat and extending from the transducer body away from the longitudinal axis.

2. The bushing transducer of claim 1, wherein portions of the first and second holes are tapped.

3. The bushing transducer of claim 1, wherein the transducer body further comprises a first mid portion arranged axially between the first flange and the first seat and a second mid portion arranged axially between the threaded portion and the second flange.

4. The bushing transducer of claim 3, wherein the first mid portion comprises a first inner portion and a first outer portion and the second mid portion comprises a second inner portion and a second outer portion.

5. The bushing transducer of claim 4, wherein one or more gages are arranged about the longitudinal axis on the first inner portion and the second inner portion.

6. The bushing transducer of claim 5, wherein the first and second inner portions are cylindrical.

7. The bushing transducer of claim 5, wherein the first and second inner portions are octagonal.

8. The bushing transducer of claim 1, wherein the first seat comprises a first conical surface and the second seat comprises a second conical surface, wherein the first conical surface faces the second conical surface.

9. The bushing transducer of claim 1, wherein the transducer body further comprises one or more channels parallel to the longitudinal axis and extending axially through the first seat and the threaded portion.

10. The bushing transducer of claim 1, wherein the anti-rotation key is an integral component of the transducer body.

11. A bushing, comprising:

a bushing body, comprising:

a first end, and a second end spaced axially from the first end with respect to a longitudinal axis;

a sleeve arranged within the bushing body between the first end and the second end, the sleeve comprising a necked portion comprising a first sleeve seat and a second sleeve seat spaced axially from the first sleeve seat with respect to the longitudinal axis, and a transducer, comprising:

a transducer body comprising a first seat extending radially from the transducer body and a threaded portion spaced axially from the first seat; and a second seat removably coupled to the threaded portion of the transducer body, axially trapping the transducer with respect to the sleeve.

12. The bushing of claim 11, wherein the sleeve further comprises a groove extending axially through a portion of the first sleeve seat and the second sleeve seat.

13. The bushing of claim 12, wherein the transducer further comprises an anti-rotation key coupled to the transducer body and arranged in the groove to prevent rotation of the transducer with respect to the sleeve.

14. The bushing of claim 11, wherein the necked portion is axially trapped between the first seat and the second seat.

15. The bushing of claim 11, wherein the first sleeve seat engages a first conical surface of the first seat and the second sleeve seat engages a second conical surface of the second seat.

16. A vehicle chassis, comprising:

a first chassis component comprising a first through hole;

a second chassis component comprising a second through hole;

a vehicle mount comprising:

a bushing body, comprising:

a first end, and a second end spaced axially from the first end with respect to a longitudinal axis;

a sleeve arranged within the bushing body between the first end and the second end, the sleeve comprising a necked portion comprising a first sleeve seat and a second sleeve seat spaced axially from the first sleeve seat with respect to the longitudinal axis; and a transducer, comprising:

a transducer body, comprising:

a first hole and a second hole extending along the longitudinal axis, a transducer aligner arranged axially between the first hole and the second hole, comprising:

a first seat in contact with the first sleeve seat, a second seat removably coupled to the transducer body and engaged with the second sleeve seat; and one or more fasteners coupling the vehicle mount to the first chassis component and the second chassis component.

17. The vehicle chassis of claim 16, wherein the first seat and the second seat comprise conical surfaces.

18. The vehicle chassis of claim 17, wherein the first sleeve seat and the second sleeve seat comprise conical sleeve surfaces.

19. The vehicle chassis of claim 18, wherein the transducer is axially and rotationally trapped within the sleeve and with respect to the longitudinal axis.

20. The vehicle chassis of claim 16, wherein the transducer comprises one or more gages coupled to the transducer body.

\* \* \* \* \*